PRIVATE BRANCH TELEPHONE EXCHANGE

Filed June 26, 1961

2 Sheets-Sheet 1

INVENTOR:

MASATOSHI KAMOSHIDA
and AKIRA HAYASHI

BY: McGlew and Toren
ATTORNEYS

PRIVATE BRANCH TELEPHONE EXCHANGE

Filed June 26, 1961

2 Sheets-Sheet 2

INVENTOR.
MASATOSHI KAMOSHIDA
and AKIRA HAYASHI
BY: McGlew and Toren
ATTORNEYS 3,185,774

PRIVATE BRANCH TELEPHONE EXCHANGE

Masatoshi Kamoshida, Fujisawa, and Akira Hayashi, Tokyo, Japan, assignors to Oki Electric Industry Company, Limited, Tokyo, Japan, a corporation of Japan Filed June 26, 1961, Ser. No. 119,515
2 Claims. (Cl. 179—27)

This invention relates to a terminating connection system from main office or outside lines to private automatic branch exchange subscriber lines wherein a line finder, used for originating connection between subscriber lines in the branch exchange and also from the subscriber lines to main exchange or outside lines is utilized to carry out terminating connection from the outside lines to the subscriber lines in the branch exchange office through an attendant board.

In the case of a connection system in a private automatic branch exchange wherein, with the extension line or a called subscriber preliminary engaged, the talking path between said subscriber and the operator is completed, terminating connection from outside lines to branch exchange subscriber lines has been carried out through lease lines quite independent of lines for originating connection from an attendant board. In such case, with an increase in the number of subscriber lines, the capacity of a switch group forming these exclusive circuits must be increased.

An object of the present invention is to provide a simple and convenient terminating connection system wherein a line finder, for originating connection of subscriber lines, or line circuits, in a private automatic branch exchange is used for terminating connection, so that an increase of the capacity of the switch group used exclusively for incoming calls, with an increase of subscriber lines, may be obviated.

Another object of the present invention is to provide a terminating connection system needing no terminating connection lease line.

A further object of the present invention is to provide a connection system wherein a line finder for telephoning between extensions is utilized to carry out extension connection from an attendant board so that no special connecting device is needed.

Another further object of the present invention is to provide a connection system wherein predetermined subscribers can be located, by means of a line finder, by virtue of a state or condition different from that of locating calling subscribers at the time of calling, and, therefore, irrespective of the condition of the connector and line finder, at the time of calling, so that offering connection is easily effected.

In the terminating connection system according to the present invention, a line finder, used for originating connection between subscriber lines or line circuits, in a private automatic branch exchange and from the subscriber lines to outside lines is utilized to carry out terminating connection from the outside lines to the subscriber lines in said branch exchange through an attendant board.

In the accompanying drawings.

Figure 1:
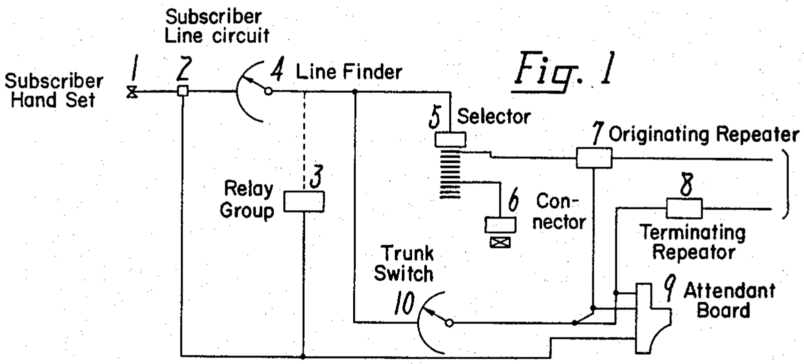
FIGURE 1 is a system diagram showing the essential parts in a private automatic branch exchange office carrying out the system according to the present invention.

With reference to the drawings, FIGURE 1 is a system diagram of the essential parts in a private automatic branch exchange office. When a subscriber calls by lifting a hand set 1, a line finder relay group 3 will operate through a subscriber line 2 so as to start a vacant line finder 4. The line finder 4 will locate and engage the calling subscriber and will connect the subscriber to a selector 5. If the subscriber's call is for connection between extensions, the calling subscriber will be connected to a connector 6 from the selector 5, and will be connected through the connector 6 to another desired subscriber in the same office. If the subscriber's call is for connection to an outside line, the calling subscriber will be connected to the outside line, through an originating repeater 7, from the selector 5. This is exactly the same as the originating connection of a subscriber in a conventional private automatic branch exchange office.

If an attendant board 9 is engaged by an outside line through a terminating repeater 8, a corresponding lamp will be lighted and will give an indication to an exchange operator. The exchange operator will hear the called number from the other party and will predetermine the subscriber by the operation of a predetermining key. Here, in the conventional private automatic branch exchange, a terminating connection lease line from the outside line will operate so that the terminating connection to that subscriber may be made. However, in the system according to the present invention, when the exchange operator predetermines the subscriber by means of the predetermining key, the same as in the case of originating connection, the line finder relay group 3 will operate to start the vacant line finder 4. The line finder 4 will locate and engage the predetermined subscriber and at the same time a trunk switch 10 will locate and engage the line finder.

Thus, the terminating connection to the subscriber line in the private automatic branch exchange from the outside line is made through the attendant board 9, trunk switch 10, line finder 4 and subscriber line 2 and is finally completed by the operator cutting off and incoming line leading to the attendant board 9 from the terminating repeater. In the drawing, a separate originating repeater and a separate terminating repeater are shown. But it is needless to say that a combined originating and terminating repeater may be used.

Figure 2:
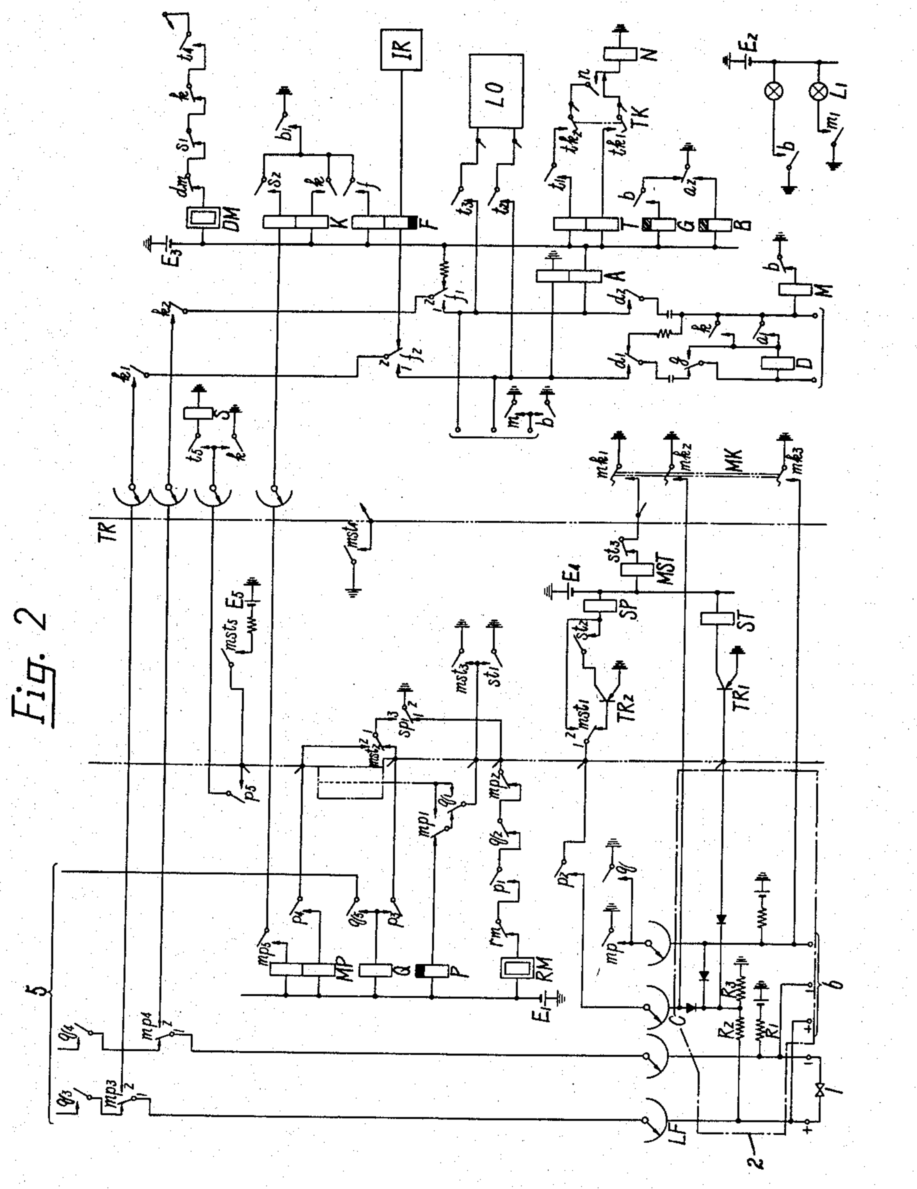
FIGURE 2 is a detailed connection circuit diagram of the system according to the present invention.

FIGURE 2 is a connection circuit diagram more particularly showing the system according to the present invention. The system of the present invention shall be explained with reference to said diagram. In the case that a subscriber calls, when the subscriber 1 lifts the transmitting and receiving handset of a telephone, a negative potential will be applied to the base of a transistor $TR_1$ through resistance $R_1$, $R_2$ and $R_3$ so that transistor $TR_1$ will become conductive and a relay ST may operate. Due to the operation of the relay ST, a contact $st_1$ will be closed, a relay P will operate with the circuit of the ground–contact $st_1$–contact $q_1$–contact $mp_1$–relay P–electric current source $E_1$–ground, the contact $p_1$ will be closed and a rotary magnet RM will operate with the circuit of the ground–contact $sp_1$–contact $mp_2$–contact $q_2$–contact $p_1$–intermittent contact $rm$–rotary magnet RM–electric current source $E_1$–ground so as to drive a line finder LF. When the wiper arrives at the bank contact in the position of the calling subscriber, the transistor $TR_2$ will be in an operating condition through the contact $mst_1$ and the contact $p_2$ closed by the operation of the relay P, and the relay SP will operate through the contact $st_2$, closed by the operation of transistor $TR_1$ and the relay ST. Thereby the contact points 1 and 2 of the contact $sp_1$ will be opened, the operating circuit of the rotary magnet RM will be cut and the line finder LF will engage the calling subscriber and will stop the operation. At the same time, by the circuit of the ground–contact $sp_1$–contact $mst_2$–contact $p_3$–relay Q–electric current source $E_1$–ground, the relay Q will be operated, the contacts $q_3$, $q_4$ and $q_5$ will be closed and the calling subscriber line will be connected to the selector 5 through the contact $mp_3$, closed contact $q_3$, contact $mp_4$ and closed contact $q_4$ through the line finder LF. The relay Q will be kept in the operating condition by the ground from the selector through the closed contact $q_5$. The operation of the above described circuit is the same as in any conventional private automatic branch exchange office. Therefore, the explanations of the circuit from the selector 5 and its operation shall be omitted.

When there is any termination from an outside or main exchange line, the relay M will operate, the contact $m_1$ will be closed and the lamp will be lighted, by the circuit of the ground–electric current source $E_2$–lamp $L_1$–contact $m_1$–ground, to inform the exchange operator at the attendant board of the termination from the incoming line. When the exchange operator brings down the key TK for the office line, the relays T and N will be operated by the circuit of the ground–electric current source $E_3$–relay T–closed contact $tk_1$ of the key TK–relay N–ground, the relay T will be self-held through the contact $n$ closed by the operation of the relay N, closed contact $tk_2$ of the key TK and its own closed contact $t_1$, and the relay A will be operated by the circuit of the ground–electric current source $E_3$–relay A–contacts $t_2$ and $t_3$ closed by the operation of the relay T–transmitting circuit loop LO for exchange–ground. The relay D will be operated by the outside line loop, including the relay D, through the contact $a_1$ closed by the operation of the relay A, the contacts $d_1$ and $d_2$ will be closed and the outside line will be connected and extended to the transmitting and receiving circuit of the exchange operator through the contacts $t_2$ and $t_3$ closed by the operation of the relay T through these contact points. The above is exactly the same as in the conventional system.

The relay B will be operated by the circuit of the ground–contact $a_2$ closed by the operation of the relay A–relay B–electric current source $E_3$–ground. If the exchange operator hears the number of a called subscriber in the private automatic branch exchange office and brings down the key MK for predetermining the subscriber, the relay MST will be operated by the circuit of the ground–closed contact $mk_1$ of the key MK–contact $st_3$–relay MST–electric current source $E_4$–ground, the contact $mst_3$ will be closed, the relay P will be operated by the circuit of the ground–contact $mst_3$–contact $q_1$–contact $mp_1$–relay P–electric current source $E_1$–ground and, as in the case of the above mentioned originating connection, the line finder LF will be driven by the operation of the rotary magnet RM. When the wiper arrives at the bank contact of the predetermined subscriber, as the ground has arrived at the C–wire through the closed contact $mk_2$ of the key MK, the relay SP will be operated by the circuit of the ground–current source $E_4$–relay SP–contact $mst_1$ whose contact points 1 and 2 are closed by the operation of the relay MST–contact $p_2$ closed by the operation of the relay P–C–wire of the line finder LF–closed contact $mk_2$ of the key MK–ground, the contact points 1 and 2 of the contact $sp_1$ will be opened, the contact points 2 and 3 will be closed, the operating circuit of the rotary magnet RM will be cut off and the line finder LF will engage the called subscriber and will stop the rotation.

At the same time, by the circuit of the ground–contact $sp_1$ whose contact points 2 and 3 are closed–contact $mst_2$ whose contact points 1 and 2 are closed by the operation of the relay MST–contact $p_4$ closed by the operation of the relay P–relay MP–electric current source $E_1$–ground, the relay MP will be operated so that the contact points 1 and 2 of the contact $mp_3$ and the contact points 1 and 2 of the contact $mp_4$ will be closed and the predetermined subscriber line thus will be extended to the attendant board but will first come to the trunk switch TR. When the driving magnet DM is operated by the circuit of the ground–contact $mst_4$–contact $t_4$ closed by the operation of the relay T–contact $k$–contact $s_1$–intermittent contact $dm$–driving magnet DM–electric current source $E_3$–ground through the contact $mst_4$ closed by the operation of the relay MST, the trunk switch TR will be driven. When the wiper arrives at the bank contact to which is connected the extension of the predetermined subscriber line extended through the contacts $mp_3$ and $mp_4$, the circuit of the ground–electric current source $E_5$–contact $mst_5$ closed by the operation of the relay MST–contact $p_5$ closed by the operation of the relay P–contact $t_5$ closed by the operation of the relay T–relay S–ground will be formed and the relay S will operate. Thereby the contact $s_1$ will be opened, the operating circuits of the driving magnet DM will be cut off, the rotating operation of the trunk switch TR will stop and the extension of the predetermined subscriber line will be engaged by the trunk switch TR. By the circuit of the ground–contact $b_1$–contact $s_2$–relay K–contact $mp_5$–electric current source $E_1$–ground, the relay K will be operated and the contacts $k_1$ and $k_2$ will be closed. By these contacts $k_1$ and $k_2$ and contacts $f_1$ and $f_2$, any calling signal will be sent out in the same conventional manner to the predetermied subscriber line from the calling signal circuit IR through the relay F. If the predetermined subscriber takes up the transmitting and receiving handset due to this signal, a direct current will flow through the relay F, the relay F will operate, the contact points 1 and 2 of the contact $f_1$ and the contact points 1 and 2 of the contact $f_2$ will be closed, the predetermined subscriber line and the outside line will be connected with each other and the terminating connection from the outside line to the predetermined subscriber line will be made. If the key TK is restored, the attendant board will be removed from this connection line and the terminating connection will be completed. By the way, the contact $mk_3$ of the key MK is to block next call from the connector 6 by the ground through contact $mk_3$.

In the case of carrying out terminating connection, when the exchange operator brings down the key MK for predetermining the called subscriber, the ground will be applied to the C-wire in the line finder LF and thereby the predetermined subscriber will be engaged. However, as shown in FIGURE 3, the same as in the case of originating connection, the predetermined subscriber may be engaged by the negative potential applied to the C-wire.

Figure 3:
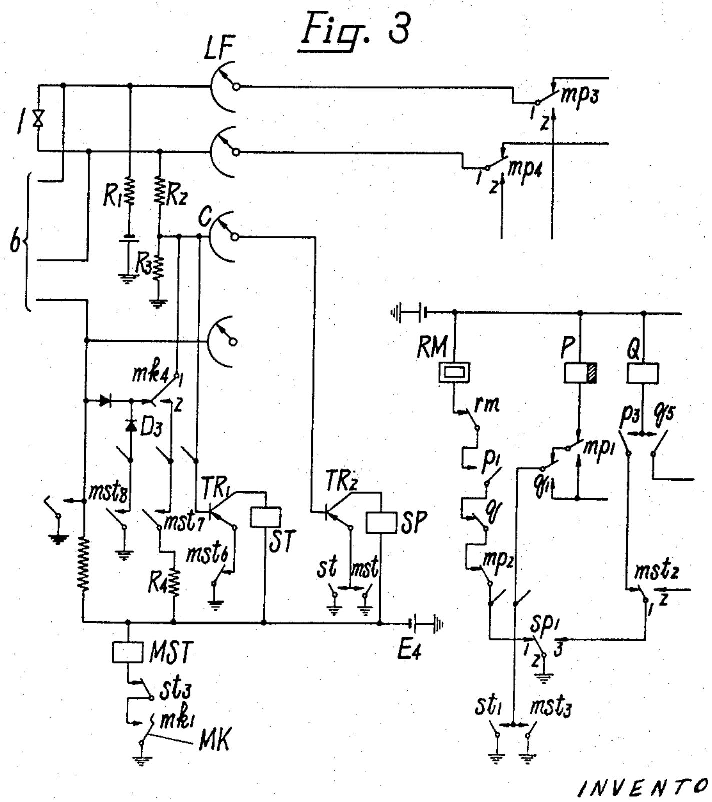
FIGURE 3 is a partial connection circuit diagram of another embodiment of the system according to the present invention.

In FIGURE 3, the same corresponding numerals are given to the parts corresponding to those in FIGURE 2. If the subscriber 1 takes up the handset of the telephone, a negative potential will be applied to the base of the transistor $TR_1$ through the resistances $R_1$, $R_2$ and $R_3$, the transistor $TR_1$ will operate and the relay ST will operate. Then, through the same course as is described above, originating connection will be made.

When the attendant board is engaged by the outside line, if the exchange operator brings down the key MK, the relay MST will be operated, by the circuit of the ground–contact $mk_1$–contact $st_3$–relay MST–electric current source $E_4$–ground, through the contact $mk_1$, the contact $mst_6$ will be opened and the contacts $mst_7$ and $mst_8$ will be closed. The C-wire will be of a negative potential through the resistance $R_4$, contact $mst_7$ closed by the operation of the relay MST, contact $mk_4$, whose contact points 1 and 2 are closed by the key MK, and resistance $R_3$.

On the other hand, the relay P will be operated through the contact $mst_3$ closed by the operation of the relay MST and, in the same manner as in the above described case, the line finder LF will be operated to engage the predetermined subscriber. When the wiper arrives at the bank contact of the predetermined subscriber, the negative potential of the C-wire will be led through the transistor $TR_2$, the relay SP will be operated, the contact points 1 and 2 of the contact $sp_1$ will be opened, the operating circuit of the rotary magnet RM to drive the line finder LF will be cut off and the predetermined subscriber will be engaged. In such case, even if any other subscriber than the predetermined subscriber takes up the handset, the ground will be applied to the C-wire of such subscriber through the contact $mst_8$ closed by the operation of the relay MST and through a rectifier $D_3$ and the handset will be in a speaking state and, even when the wiper arrives at the bank contact, it will not stop.

According to the system of the present invention shown in FIGURE 2, at the time of originating connection, the calling subscriber will be engaged by the virtue of the negative potential applied to the C-wire and, at the time of terminating connection, the called subscriber will be engaged by virtue of the ground applied to the C-wire, whereby the respective engagements are effected by virtue of respectively different states of the C-wire. Therefore, irrespective of conditions for the connector and line finder at the time of calling, terminating connection can be made and offering connection can be so easily carried out that it is superior to the system shown in FIGURE 3.

What is claimed is:

1. A private branch telephone exchange, including a termination of a main line from a main telephone exchange, comprising: a plurality of subscriber telephone sets; a plurality of line circuits; each telephone set being connected to a respective one of said line circuits; connector switch means operable for selectively interconnecting any one of said line circuits with any other one of said line circuits; originating repeater means operable for connecting any one of said line circuits with the termination of the main line; selector switch means operable for operating said connector switch means and said originating repeater means; line-finder switching means connected with each said line circuit and operable for operating said selector switch means; relay means connected with each line circuit for operating said line-finder switching means in response to subscriber actuation of the telephone set connected thereto, said line-finder switching means being operated to interconnect the subscriber-actuated telephone set and its associated line circuit with said selector switch means; a telephone switchboard connected with all said line circuits and including manually operable switch means for connecting any said line circuit directly to said originating repeater means; terminating repeater means connected between the termination of the main line and said switchboard; and trunk switch means connected between said line-finder switching means and said switchboard, said switchboard including additional switch means to interconnect said terminating repeater means with any said line circuit and to operate said relay means and said line-finder switching means and to actuate said trunk switch means to operate said line-finder switching means thereby causing said terminating repeater means to be connected to said line circuit through said trunk switch means and said line-finder switching means.

2. In a private branch telephone exchange for plural subscriber telephone sets and associated plural line circuits including call-originating and call-terminating repeater means connected with a main line of a main telephone exchange, line-finder means operable by each of the subscriber telephone sets for interconnecting each line circuit with the originating repeater means; a manually operable switchboard; trunk switch means for finding said line-finder means and interconnecting said line-finder means with said switchboard; said switchboard being interconnected with each line circuit, said switchboard being operable to operate said line-finder means and said trunk switch means whereby the call terminating repeater means is connected through said trunk switch means and said line-finder means to any line circuit.

References Cited by the Examiner

UNITED STATES PATENTS

| | | | |
|---|---|---|---|
| 2,207,530 | 7/40 | Beale | 179—26 |
| 2,911,480 | 11/59 | Lomax | 179—26 |

ROBERT H. ROSE, *Primary Examiner.*

THOMAS B. HABECKER, *Examiner.*